United States Patent
Horiuchi et al.

(10) Patent No.: US 11,152,132 B2
(45) Date of Patent: Oct. 19, 2021

(54) COVERING MATERIAL FOR ELECTRIC WIRE AND COVERED ELECTRIC WIRE

(71) Applicant: YAZAKI CORPORATION, Tokyo (JP)

(72) Inventors: Yuki Horiuchi, Shizuoka (JP); Daisuke Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 707 days.

(21) Appl. No.: 14/945,531

(22) Filed: Nov. 19, 2015

(65) Prior Publication Data

US 2016/0071629 A1    Mar. 10, 2016

Related U.S. Application Data

(63) Continuation of application No. PCT/JP2014/063061, filed on May 16, 2014.

(30) Foreign Application Priority Data

May 23, 2013    (JP) .............................. JP2013-108574

(51) Int. Cl.
*C08K 5/12*   (2006.01)
*H01B 3/44*   (2006.01)
*C08L 101/00* (2006.01)

(52) U.S. Cl.
CPC .............. *H01B 3/443* (2013.01); *C08K 5/12* (2013.01); *C08L 101/00* (2013.01); *H01B 3/44* (2013.01)

(58) Field of Classification Search
CPC ...................................................... H01B 3/443
USPC ........................ 524/296, 295; 428/34.1, 35.7
See application file for complete search history.

(56) References Cited

U.S. PATENT DOCUMENTS

2012/0172511 A1    7/2012 Furukawa et al.

FOREIGN PATENT DOCUMENTS

| | | |
|---|---|---|
| JP | H06-223630 A | 8/1994 |
| JP | 2011-126980 A | 6/2011 |
| WO | 2011-152295 A1 | 12/2011 |
| WO | 2012-165480 A1 | 12/2012 |

OTHER PUBLICATIONS

Chlorinated Polyethylene (ELASLEN) Grade List; 352GB (Year: 2013).*
The Official Action dated Feb. 21, 2017 in the counterpart Japanese patent application.
The Official Action dated Nov. 29, 2016 in the counterpart Japanese patent application.
Showa Denko K.K. Basic Chemicals Div, Chlorinated Polyethylene: Elaslen TM, Oct. 2012.

* cited by examiner

*Primary Examiner* — Ellen S Hock
(74) *Attorney, Agent, or Firm* — Metrolex IP Law Group, PLLC

(57) ABSTRACT

A covering material for an electric wire contains a polyvinyl chloride. The covering material has a property of a change curve of loss modulus with respect to temperature which shows no peak within a temperature range in a usage environment for the electric wire.

3 Claims, 4 Drawing Sheets

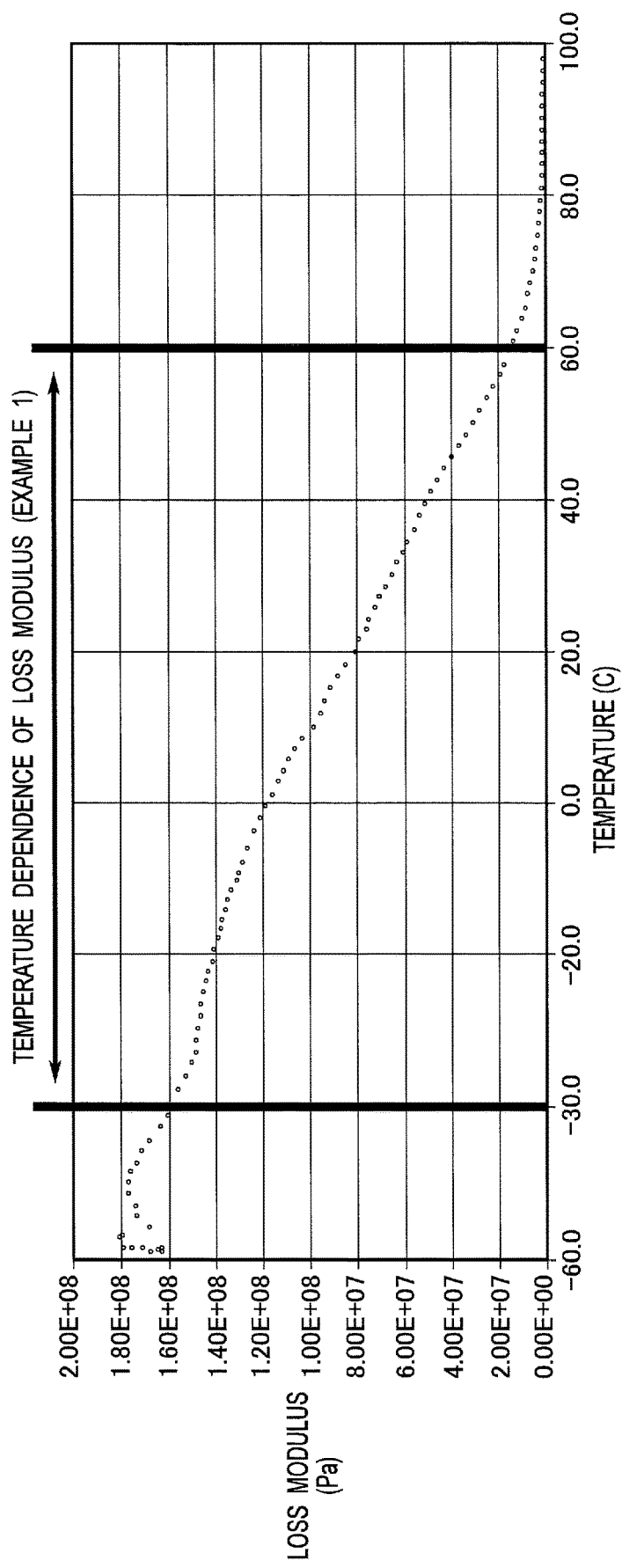

FIG. 5

| MATERIAL | | | MANUFACTURER | TRADE NAME |
|---|---|---|---|---|
| POLYVINYL CHLORIDE | DEGREE OF POLYMERIZATION 1300 | | TAIYO VINYL CORPORATION | TH-1300 |
| POLYVINYL CHLORIDE | DEGREE OF POLYMERIZATION 1400 | | TAIYO VINYL CORPORATION | TH-1400 |
| PLASTICIZER | DUP | | NEW JAPAN CHEMICAL CO., LTD. | SANSO CIZER DUP |
| PLASTICIZER | DIDA | | NEW JAPAN CHEMICAL CO., LTD. | SANSO CIZER DIDA |
| PLASTICIZER | n-TOTM | | KAO CORPORATION | TRIMEX N-08 |
| FLEXIBLE RESIN | CHLORINATED POLYETHYLENE | MFR:0.8/10min | SHOWA DENKO K.K. | ELASLEN 352GB |
| | | MFR:0.1/10min | SHOWA DENKO K.K. | ELASLEN 301MA |
| | | MFR:1.2/10min | SHOWA DENKO K.K. | ELASLEN 401A |
| | EVA | MFR:0.8/10min | DUPONT-MITSUI POLYCHEMICALS CO., LTD | EVAFLEX V5274 |
| | | MFR:2.5/10min | DUPONT-MITSUI POLYCHEMICALS CO., LTD | EVAFLEX EV460 |
| | NBR | | JSR CORPORATION | JSRN215SL |
| STABILIZER | | | ADEKA CORPORATION | ADK STAB RUP-11 |

COVERING MATERIAL FOR ELECTRIC WIRE AND COVERED ELECTRIC WIRE

CROSS REFERENCE TO RELATED APPLICATION

This application is a Continuation of PCT Application No. PCT/JP2014/063061, filed on May 16, 2014, and claims the priority of Japanese Patent Application No. 2013-108574, filed on May 23, 2013, the content of both of which is incorporated herein by reference.

BACKGROUND

Technical Field

The disclosure relates to a covering material for an electric wire, which is used for covering a conductor such as an aluminum wire or a copper wire, and a covered electric wire, in particular, to a covering material for an electric wire, which is used for an electric wire provided in a car, and a covered electric wire.

Related Art

For electric wires such as wire harnesses for use in cars, flexion resistance in a wide range of temperatures is required to be provided in significantly bent fashion in short pathways, and cope with temperature changes of car bodies. For this reason, materials with flexion resistance have been used as covering materials for covering conductors.

Japanese Unexamined Patent Application Publication No. 2011-126980 discloses the use of, as a covering material for an electric wire, a composition with a polyvinyl chloride resin as a base resin, in which a plasticizer such as a trimellitic acid-based plasticizer or a pyromellitic plasticizer, a chlorinated polyolefin, and an MBS (methyl methacrylate-butadiene-styrene) rubber are combined at predetermined ratios by weight with respect to the base resin. Japanese Unexamined Patent Application Publication No. 2011-126980 discloses preparing an electric wire with the covering material for an electric wire, thereby allowing for an electric wire that has excellent cold resistance, abrasion resistance, and damage resistance.

SUMMARY

In the above regard, the covering material for an electric wire as disclosed in Japanese Unexamined Patent Application Publication No. 2011-126980 undergoes a significant decrease in flexion resistance under low-temperature environment. This is because the polyvinyl chloride as a base resin has a peak value for loss modulus in a low-temperature region, and the molecular motion of the resin is significantly decreased when the environmental temperature is the temperature for the peak value or lower. This covering material for an electric wire as disclosed in Japanese Unexamined Patent Application Publication No. 2011-126980 is poor in flexion resistance under low-temperature environment, and an electric wire with a conductor covered with the covering material for an electric wire thus fails to have flexion resistance in a wide range of temperatures. In addition, when the amount of the plasticizer is increased in order to lower the peak value for loss modulus, properties of V-edge resistance and resistance to high-temperature melting will be decreased.

An object of the disclosure is to provide a covering material for an electric wire, which has favorable flexion resistance, and a covered electric wire that uses the covering material for an electric wire.

A covering material for an electric wire in accordance with some embodiments contains a polyvinyl chloride, wherein the covering material has a change curve of loss modulus with respect to temperature which shows no peak within a temperature range in a usage environment for the electric wire.

25 to 50 parts by weight of a plasticizer and 1 to 30 parts by weight of a flexible resin may be combined with respect to 100 parts by weight of the polyvinyl chloride.

2 to 20 parts by weight of the flexible resin with a melt flow rate (MFR) of 1.0 g/10 min or less may be combined with respect to 100 parts by weight of the polyvinyl chloride.

The polyvinyl chloride may have a degree of polymerization of 1400 or more.

The temperature range in the usage environment for the electric wire may be −30° C. to 60° C.

The change curve of loss modulus with respect to temperature may be obtained by making a dynamic viscoelastic measurement, and the dynamic viscoelastic measurement may be made in a way that a specimen with a size of 10×2×1 mm is used under conditions of a temperature in the range of −60° C. to 100° C. and a measurement frequency of 1 Hz in a single cantilever measurement mode.

A covered electric wire in accordance with some embodiments includes: the above covering material for the electric wire; and a conductor covered with the covering material for the electric wire.

The composition mentioned above has the characteristics of no peak exhibited by the change curve of loss modulus with respect to temperature within a temperature range in a usage environment for the electric wire, and the loss modulus is thus high over the entire temperature range in the usage environment for the electric wire. For this reason, molecular chains of the resin achieves strain release during flexion, and thus can provide favorable flexion resistance in a wide range of temperatures. Furthermore, PVC wires can be provided which have excellent V-edge resistance and resistance to high-temperature melting.

BRIEF DESCRIPTION OF DRAWINGS

FIG. 4 is change curve showing a change in loss modulus of resin according to Example 1 with respect to temperature.

FIG. 5 is a list showing the types and manufacturer of flexible resins, plasticizers, and a stabilizer used in examples.

DETAILED DESCRIPTION

A covering material for an electric wire according to an embodiment of the present invention is composed of a composition containing a polyvinyl chloride, and this composition is a composition that has the characteristics of no peak exhibited by a change curve of loss modulus with respect to temperature within a temperature range in a usage environment for the electric wire. This composition is used for covering a conductor of an electric wire.

In general, a material that has a relatively high peak temperature for loss modulus, and that undergoes a decrease in loss modulus in a low-temperature environment undergoes a decrease in flexibility of electric wire under low-temperature environment.

Figure 1:
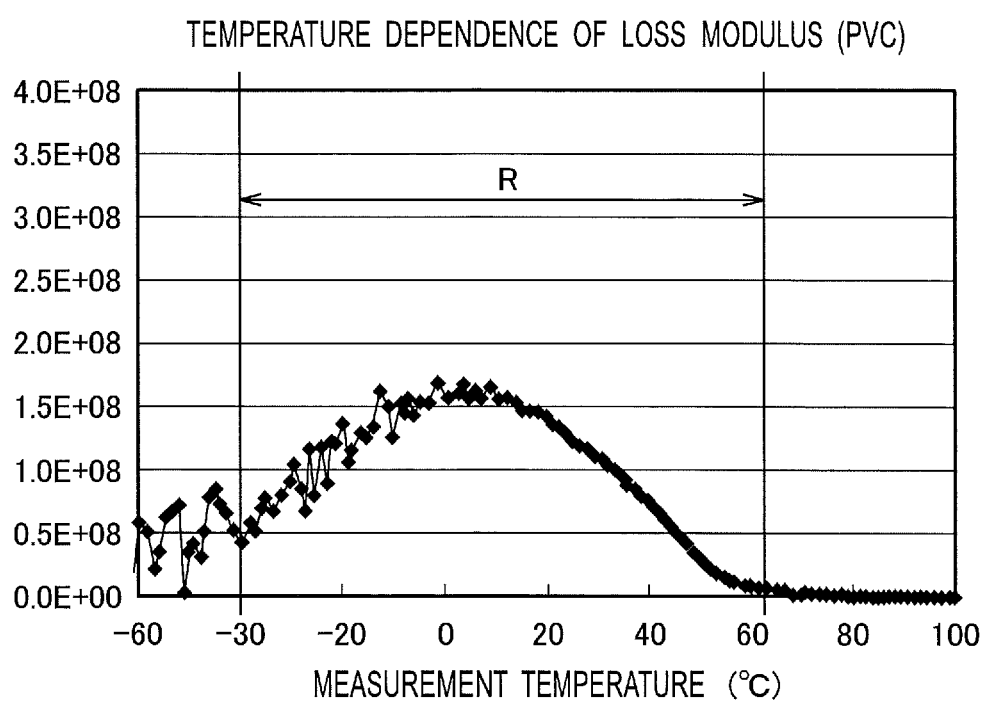
FIG. 1 is a change curve showing a change in loss modulus of polyvinyl chloride resin with respect to temperature.

FIG. 1 shows a change curve for the loss modulus of polyvinyl chloride (PVC) which changes depending on the temperature. In FIG. 1, a range R refers to a temperature range in a usage environment for the electric wire, and the range of −30° C. to 60° C. is regarded as the temperature range in the usage environment.

The change curve of the loss modulus with respect to the temperature can be obtained by making a dynamic viscoelastic measurement. The dynamic viscoelastic measurement is made in a way that a specimen with a size of 10×2×1 mm is used under the conditions of a temperature in the range of −60° C. to 100° C. and a measurement frequency of 1 Hz in a single cantilever measurement mode. The measurement under the conditions is performed in the same way for the measurement of the loss modulus in the following embodiments of the present invention.

The resin material (PVC) in FIG. 1 has a peak around −5° C., and this resin material undergoes a significant decrease in flexibility in a temperature range of low temperatures.

In contrast, for example, as for a resin material according to Example 1, a change curve for the loss modulus shows no sharp peak over the entire temperature range in a usage environment for the electric wire. The resin material without such a peak has favorable flexibility over a range of low temperatures to high temperatures.

From the foregoing findings, the covering material for an electric wire according to the embodiment of the present invention is supposed to be a composition containing a polyvinyl chloride, and have a composition that has the characteristics of no peak exhibited by a change curve of loss modulus with respect to temperature in a temperature range in a usage environment for the electric wire.

The polyvinyl chloride exhibits a peak in the change curve of loss modulus, with respect to temperature as shown in FIG. 1, but can be used as a base resin for the covering material for an electric wire according to an embodiment of the present invention, because the peak in the change curve of the loss modulus is eliminated by combining a plasticizer or a flexible resin. The polyvinyl chloride with the degree of polymerization from 800 to 2500 favorable in terms of workability.

The plasticizer acts to lower the glass transition temperature of base resin by penetrating into voids of the base resin. The plasticizer is selected to be compatible with the base resin. This plasticizer preferably has a fuming temperature of 150° C. or higher in conformity with "JASO D 609". In addition, in order to lower the peak temperature for the loss modulus, the pour point is favorably lower, and for example, the use of a plasticizer with a pour point lower than −20° C. provides favorable flexibility at low temperature (hereinafter, low-temperature flexibility).

One or more of a phthalate ester, an adipate ester, and a trimellitate ester can be used as the plasticizer. DINP (diisononyl phthalate), DIDP (diisodecyl phthalate), DIDA, and the like can be used as the phthalate ester. DINA (diisononyl adipate) and the like can be used as the adipate ester. As the trimellitate ester, n-TOTM (trioptyl trimellitate) can be used.

One or more of chlorinated polyolefins such as chlorinated polyethylenes, acrylic rubbers, and acrylic and styrene elastomers can be used as the flexible resin. In this case, the amount of chlorinated polyethylene combined is favorably low in terms of cost. NBR (nitrile rubbers) and the like can be used as the acrylic rubbers. EVA (ethylene vinyl acetate copolymers), EEA, EMA, and the like can be used as the elastomers.

As a combination example, in the case of using a polyvinyl chloride as the base resin, 25 to 50 parts by weight of the plasticizer and 1 to 30 parts by weight of the chlorinated polyolefin such as a chlorinated polyethylene are combined with respect to 100 parts by weight of the polyvinyl chloride, thereby eliminating the peak of the loss modulus, that is, eliminating the decrease in loss modulus, and thus providing favorable flexibility at low temperature.

On the other hand, when a covered electric wire of a conductor coated with the covering material for an electric wire is used in a high-temperature environment, there is concern that the conductor will be exposed when the covering material for an electric wire is malted. In order to prevent the covering material for an electric wire from being melted in high-temperature environments, it is preferable in an embodiment of the present invention to use, as the base resin, a polyvinyl chloride with the degree of polymerization of 1400 or more, and combine, with the polyvinyl chloride, the flexible resin which is less likely to flow in high-temperature environments.

When the degree of polymerization of the polyvinyl chloride is less than 1400, the resistance to high-temperature melting at 160° C. is satisfied, while the resistance to high-temperature melting at 170° C. is not able to be satisfied, and a polyvinyl chloride with the degree of polymerization of 1400 or more is thus favorably used as the base resin of the covering material for an electric wire for use under high-temperature environments. In addition, the flexible resin which is less likely to flow in high-temperature environments preferably has a melt flow rate (MFR) of 1.0 g/10 min or less. The MFR in excess of 1.0 g/10 min makes it difficult to satisfy the resistance to high-temperature melting. The MFR herein refers to a melt flow rate of 21.6 kg at 180° C. as specified by the JIS K7210.

As the combination proportions in the covering material for an electric wire with resistance to high-temperature melting, the plasticizer and the flexible resin with a MFR of 1.0 g/10 min or less are favorably 25 to 50 parts by mass and 1 to 30 parts by mass respectively with respect to 100 parts by mass of the polyvinyl chloride (the degree of polymerization of 1400 or more). The low-temperature flexibility is not able to be satisfied when the combination proportion of the plasticizer is less than 25 parts by mass, whereas V-edge resistance is not able to be satisfied in excess of 50 parts by mass. In addition, the low-temperature flexibility is not able to be satisfied when the combination proportion of the chlorinated polyethylene is less than 1 part by mass, whereas the resistance to high-temperature melting is not able to be satisfied in excess of 30 parts by mass.

The composition according to an embodiment of the present invention contains a polyvinyl chloride, and additionally, a flame retardant for imparting flame retardancy can be added to the composition. As the flame retardant, one or more of metal compounds having a hydroxyl group or crystallization water can be used, such as a magnesium hydroxide, an aluminum hydroxide, a calcium hydroxide, a basic magnesium carbonate, a hydrated aluminum silicate, and a hydrated magnesium silicate. In addition, bromine-based flame retardants can be also used as the flame retardant.

The composition according to an embodiment of the present invention can be further combined with additives such as flame retardant aids, antioxidants, metal deactivators, anti-aging agents, lubricants, fillers, reinforcing agents, ultraviolet absorbers, stabilizers, plasticizers, pigments, dyes, colorants, antistatic agents, and foaming agents.

The composition according to an embodiment of the present invention can be produced by pre-blending the materials mentioned above with the use of a high-speed mixing device such as a Henschel mixer, and kneading the materials then with the use of a kneading machine such as a Bambari mixer, a kneader, and a roll mill.

Figure 2:
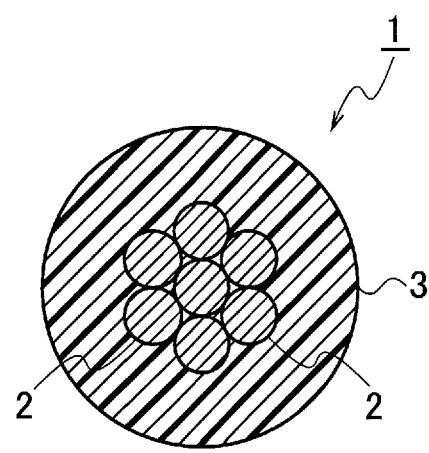
FIG. 2 is a cross-sectional view illustrating a covered electric fire according to an embodiment of the present invention.

FIG. 2 shows a covered electric wire 1 according to an embodiment of the present invention. The covered electric wire 1 is formed by covering the conductor 2 with the covering material 3 for an electric wire which has the composition as described above.

The conductor 2 may be a strand, or a bundle of strands. Common conductive metals, plating fibers, conductive polymers, and CNT (carbon nanotubes) can be used as the conductor 2. Above all, in particular, copper, aluminum, and alloys thereof, and iron-based alloys can be favorably used in terms of cost.

Common extrusion molding can be employed as a means of covering the conductor 2 with the covering material 3 for an electric wire. For the extrusion molding, a single-screw extruder or a twin screw extruder can be used.

As the covered electric wire 1, for example, a core (eleven twisted wires) of the conductor 2 of 1.00 mm in diameter can be coated with the covering material 3 for an electric wire to prepare a covered electric wire of 1.40 mm in outside diameter.

According to the embodiment of the present invention as described above, the composition containing a polyvinyl chloride is adapted to have a composition that has the characteristics of no peak exhibited by a change curve of loss modulus with respect to temperature in a temperature range in a usage environment for the electric wire, thereby increasing the loss modulus over the entire the temperature range in the usage environment for the electric wire. For this reason, molecular chains of the resin constituting the composition can achieve strain release during flexion, and provide favorable flexion resistance in a wide range of temperatures within the temperature range in the usage environment for the electric wire.

Tables 1 and 2 show evaluations in the case of, with the use of, as the base resin, a polyvinyl chloride resin with the degree of polymerization of 1300, combining the base resin with the plasticizer and the flexible resin in accordance with the ratios by weight as shown in the tables, thereby preparing materials for electric wires. Table 1 shows Examples 1 to 8 of the present invention, whereas Table 2 shows Comparative Examples 1 to 4.

In these tables, the "DUP", "DIDA", and "n-TOTM" refer to plasticizers, and the "Chlorinated Polyethylene", "EVA", and "NBR" refer to flexible resins. The "E" Peak Temperature" refers to a peak temperature in the case of a change curve of loss modulus with respect to temperature with a peak.

The "Scrape Abrasion" was evaluated as "B" for 1000 times or more or "C" for less than 1000, in a way that a covered electric wire was formed from an aluminum conductor of 0.75 mm² and a covering layer composed of a covering material for an electric wire with a thickness of 0.2 mm, and subjected to a scrape abrasion test in conformity with ISO 6722.

Deterioration is found for any of the "Low Temperature Flexibility" and "Scrape Abrasion" as shown in Table 2 in Comparative Examples 1 to 4, whereas favorable results are achieved for all of the "Low Temperature Flexibility" and "Scrape Abrasion" as shown in Table 1 in Examples 1 to 8. More specifically, even in the case of, as the base resin, the polyvinyl chloride resin for the change curve of loss modulus with respect to temperature with a peak, the plasticizer or the flexible resin can be combined to provide a composition for a curve without any peak. Thus, the flexibility at low temperature can be prevented from being lowered, with favorable evaluations on the flexing test, and also favorable scrape abrasion.

Further, FIG. 4 shows a change in loss modulus of the resin listed in Example 1 with respect to temperature. According to the drawing, it is determined that the loss modulus (Pa) is 1.60 E in the case of a low temperature (−30° C.), with no peak between −30° C. to +60° C.

Tables 3 and 4 show evaluations in the case of using polyvinyl chlorides with the degrees of polymerization of 1300 and 1400 as the base resin, and combining 100 parts by mass of the base resin with: a DUP with a fuming temperature of 160° C. and an n-TOTM with a fuming temperature of 170° C. as the plasticizer; a chlorinated polyethylene with an MFR of 0.8 g/10 min, a chlorinated polyethylene with an MFR of 0.1 g/10 min, and a chlorinated polyethylene with an MFR of 1.2 g/10 min, as the flexible resin; and a stabilizer in terms of parts by mass as shown in the tables. Table 3 shows Examples 9 to 15, whereas Table 4 shows Comparative Examples 5 to 9.

The evaluations were made on low-temperature flexibility, V-edge resistance test, and high-temperature melting.

Figure 3:
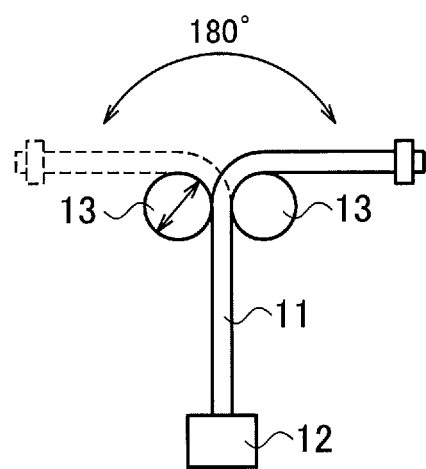
FIG. 3 is a front view of a flex testing device.

The "Low Temperature Flexibility" refers to an evaluation result obtained with a testing device as shown in FIG. 3. More specifically, a covered electric wire 11 was formed from an aluminum conductor of 0.75 mm² and a covering layer with a thickness of 0.2 mm, composed of a covering material for an electric wire in accordance with the combination ratios in Tables 3 and 4, a weigh of 800 g was hung on the covered electric wire 11, and under a temperature condition of −30° C., an evaluation was made as "B" when reciprocating flexion was possible 500 times or more, whereas an evaluation was made as "C" when reciprocating flexion was possible less than 500 times.

For the "V-edge Resistance Test", a covered electric wire was formed from an aluminum conductor of 0.75 mm² and a covering layer with a thickness of 0.2 mm, composed of a covering material for an electric wire in accordance with the combination ratios in Tables 3 and 4, the covered electric wire was placed on a SUS plate, and an V edge with a head of R=0.5 mm and an angle 30° was pressed against the wire at a rate of 5 mm/min to measure the maximum load until reaching conduction. An evaluation was made as "B" when the maximum load was 80 N or more, whereas an evaluation was made as "C" when the maximum load was less than 80 N.

For the "High-Temperature Melting Resistance Test", a covered electric wire was formed from an aluminum conductor of 0.75 mm² and a covering layer with a thickness of 0.2 mm, composed of the covering material for an electric wire in Tables 3 and 4, and this covered electric wire was wound around a mandrel with the same diameter so as not to cause any gaps between the electric wires, and left for 30 minutes under an environment at 160° C. An evaluation was made as "B" when the conductor was not exposed in the case of releasing the winding, "C" when the conductor was exposed, or "A" when the conductor was not exposed in the case of releasing the winding even after leaving the wire for 30 minutes under an environment at 170° C.

Deterioration is found for any of the "Low-Temperature Stability", "V-edge Resistance Test", and "Resistance to High-Temperature Melting" as shown in Table in Comparative Examples 5 to 9. On the other hand, favorable results are achieved for all of the "Low-Temperature Stability", "V-edge Resistance Test", and "Resistance to High-Temperature Melting" as shown in Table 3 in Examples 9 to 15. In particular, in the case of the covering materials for electric wires, obtained by combining the polyvinyl chloride with the degree of polymerization of 1400 with the chlorinated polyethylenes with the MFR of 1.0 g/10 min or less, favorable results are also achieved for the resistance to high-temperature melting at 170° C.

Furthermore, the types and manufacturer of flexible resins, plasticizers, and stabilizer used in the respective examples according to the present embodiment are shown in the list of FIG. 5.

In this way, the present invention includes various embodiments not described above. Therefore, the scope of the present invention is determined only by the invention identification matters according to claims reasonable from the foregoing description.

TABLE 1

|  | Example | | | | | | | |
|---|---|---|---|---|---|---|---|---|
|  | 1 | 2 | 3 | 4 | 5 | 6 | 7 | 8 |
| Polyvinyl Chloride (Degree of Polymerization: 1300) | 100 | 100 | 100 | 100 | 100 | 100 | 100 | 100 |
| Plasticizer (DUP) | 50 | 40 | 40 | 0 | 25 | 25 | 40 | 40 |
| Plasticizer (DIDA) | 0 | 0 | 0 | 0 | 0 | 0 | 0 | 0 |
| Plasticizer (n-TOTM) | 0 | 0 | 0 | 40 | 0 | 0 | 0 | 0 |
| Flexible Resin (Chlorinated PE) | 10 | 10 | 10 | 10 | 30 | 1 | 0 | 0 |
| Flexible Resin (EVA) | 0 | 0 | 0 | 0 | 0 | 0 | 10 | 0 |
| Flexible Resin (NBR) | 0 | 0 | 0 | 0 | 0 | 0 | 0 | 10 |
| Olefinic Elastomer | 0 | 0 | 0 | 0 | 0 | 0 | 0 | 0 |
| E" Peak Temperature | no peak | no peak | no peak | no peak | no peak | no peak | no peak | no peak |
| 180° Flex Test 20° C. | B | B | B | B | B | B | B | B |
| −10° C. | B | B | B | B | B | B | B | B |
| −20° C. | B | B | B | B | B | B | B | B |
| −25° C. | B | B | B | B | B | B | B | B |
| Scrape Abrasion | B | B | B | B | B | B | B | B |

TABLE 2

|  | Comparative Example | | | |
|---|---|---|---|---|
|  | 1 | 2 | 3 | 4 |
| Polyvinyl Chloride (Degree of Polymerization: 1300) | 100 | 100 | 100 | 100 |
| Plasticizer (DUP) | 60 | 20 | 25 | 50 |
| Plasticizer (DIDA) | 0 | 0 | 0 | 0 |
| Plasticizer (n-TOTM) | 0 | 0 | 0 | 0 |
| Flexible Resin (Chlorinated PE) | 0 | 10 | 0 | 35 |
| Flexible Resin (EVA) | 0 | 0 | 0 | 0 |
| Flexible Resin (NBR) | 0 | 0 | 0 | 0 |
| Olefinic Elastomer | 0 | 0 | 0 | 0 |
| E" Peak Temperature | −40 | −17 | −19 | no peak temperature |
| 180° Flex Test 20° C. | B | B | B | B |
| −10° C. | B | B | B | B |
| −20° C. | B | C | C | B |
| −25° C. | B | C | C | B |
| Scrape Abrasion | C | B | B | C |

TABLE 3

|  | Example | | | | | | |
|---|---|---|---|---|---|---|---|
|  | 9 | 10 | 11 | 12 | 13 | 14 | 15 |
| PVC (Degree of Polymerization: 1300) | 100 | 100 | 100 | 100 | 100 | | |
| PVC (Degree of Polymerization: 1400) | | | | | | 100 | 100 |
| DUP (Fuming Temperature: 160° C.) | 25 | 50 | 35 | 35 | 35 | 35 | |
| TOTM (Fuming Temperature: 170° C.) | | | | | | | 35 |
| Chlorinated Polyethylene (MFR: 0.8/10 min) | 10 | 10 | 1 | 15 | | 10 | 10 |
| Chlorinated Polyethylene (MFR: 0.1/10 min) | | | | | 10 | | |
| Chlorinated Polyethylene (MFR: 1.2/10 min) | | | | | | | |
| Stabilizer | 5 | 5 | 5 | 5 | 5 | 5 | 5 |
| Low Temperature Flexibility | B | B | B | B | B | B | B |
| V-edge Resistance Test | B | B | B | B | B | B | B |
| Resistance to High Temperature Melting | B | B | B | B | B | A | A |

TABLE 4

|  | Comparative Example | | | | |
|---|---|---|---|---|---|
|  | 5 | 6 | 7 | 8 | 9 |
| PVC (Degree of Polymerization: 1300) | 100 | 100 | 100 | 100 | 100 |
| PVC (Degree of Polymerization: 1400) | | | | | |
| DUP (Fuming Temperature: 160° C.) | 20 | 55 | 35 | 35 | 35 |
| TOTM (Fuming Temperature: 170° C.) | | | | | |
| Semicrystalline Chlorinated Polyethylene (MFR: 0.8/10 min) | 10 | 10 | 0 | 17 | |
| Semicrystalline Chlorinated Polyethylene (MFR: 0.1/10 min) | | | | | |
| Semicrystalline Chlorinated Polyethylene (MFR: 1.2/10 min) | | | | | 10 |
| Stabilizer | 5 | 5 | 5 | 5 | 5 |

TABLE 4-continued

|  | Comparative Example | | | | |
| --- | --- | --- | --- | --- | --- |
|  | 5 | 6 | 7 | 8 | 9 |
| Low Temperature Flexibility | C | B | C | B | B |
| V-edge Resistance Test | B | C | B | B | B |
| Resistance to High Temperature Melting | B | B | B | C | C |

What is claimed is:

1. A covering material for an electric wire, the covering material having a composition containing a polyvinyl chloride,
wherein the composition of the covering material comprises a characteristic such that a change curve of a loss modulus with respect to temperature for the composition of the covering material containing the polyvinyl chloride has no peak within a temperature range of −30° C. to 60° C., which is a temperature range in a usage environment for the electric wire, and
wherein the composition of the covering material comprises more than or equal to 35 parts by weight and less than or equal to 50 parts by weight of a plasticizer and 2 to 20 parts by weight of a flexible resin with a melt flow rate of 1.0 g/10 min or less, the plasticizer and the flexible resin combined with respect to 100 parts by weight of the polyvinyl chloride such that the composition comprises the characteristic.

2. The covering material for the electric wire according to claim 1, wherein the polyvinyl chloride has a degree of polymerization of 1400 or more.

3. A covered electric wire comprising:
a covering material for an electric wire, the covering material having a composition containing a polyvinyl chloride, wherein the composition of the covering material comprises a characteristic such that a change curve of a loss modulus with respect to temperature for the composition of the covering material containing the polyvinyl chloride has no peak within a temperature range of −30° C. to 60° C., which is a temperature range in a usage environment for the electric wire, and wherein the composition of the covering material comprises more than or equal to 35 parts by weight and less than or equal to 50 parts by weight of a plasticizer and 2 to 20 parts by weight of a flexible resin with a melt flow rate of 1.0 g/10 min or less, the plasticizer and the flexible resin combined with respect to 100 parts by weight of the polyvinyl chloride such that the composition comprises the characteristic; and
a conductor covered with the covering material for the electric wire.

* * * * *